United States Patent Office 3,088,844
Patented May 7, 1963

3,088,844
PACKAGING MATERIAL AND PROCESS
OF MAKING
Gordon P. Hungerford, Pittsford, N.Y., and Charles W. Cooper and James L. Kaufman, Columbus, Ohio, assignors, by direct and mesne assignments, to National Distillers and Chemical Corporation, a corporation of Virginia
No Drawing. Filed Sept. 3, 1959, Ser. No. 837,767
16 Claims. (Cl. 117—47)

This invention relates generally to improved sheeting material from polyolefins, and more specifically to novel coated polyolefin films which are adapted for use in automatic wrapping and packaging machinery, and to processes whereby such films are made.

It is an object of this invention to provide a method for imparting certain characteristics to polyolefin structures, including the ability to form peelable heat seals under a variety of sealing conditions, good hot slip characteristics, and increased stiffness or "handle" properties.

It is another object of this invention to provide coating compositions for improving the surface properties of polyolefins whereby the polyolefins can be readily employed in existing commercial wrapping and packaging machinery, without major modification to produce packages having easily opened seals.

It is another object of this invention to provide coated polyolefin structures having on at least one surface thereof a coating composition which permits heat sealability over a wide temperature range, improves the "hot slip" properties, and improves the stiffness characteristics of the polyolefin.

It is also an object of this invention to produce polyolefin film having a coating thereon, the coated film having improved stiffness properties and being especially adapted for use in automatic wrapping and packaging machinery.

It is also an object of this invention to provide a method of modifying highly molecularly oriented polyolefin films and to enable them to be heat sealed over a wide temperature range without excessive shrinkage due to disorientation.

Other objects and advantages of the invention will become apparent from the more detailed description presented herein below.

The field of packaging with transparent flexible film, especially for overwrap purposes, has long been dominated by cellophane film. Although, in some instances, thermoplastic polyolefin films and sheeting materials have been employed for wrapping and packaging purposes, they have, in many instances, not proven to be very satisfactory. In general, in the past, the two types, cellophane and polyolefin sheeting material have been used for different purposes. For example, cellophane and especially sheeting material in which the basic cellulosic film is coated with various types of coating to permit either heat or solvent sealing, has been used extensively for the so-called "overwrap" applications wherein such products as bread and boxed products of all types are packaged in automatic wrapping and packaging machinery. Among the advantages for cellophane has been the fact that the packages are thus given a final overwrap of the transparent sheeting material which can be heat sealed to effect a closure and thus form a product completely encased in the sheeting or wrapping material. In addition, such a seal can readily be broken by the consumer at the time of use without necessarily tearing or destroying the sheeting material. Many of the uses of the coated or uncoated cellophane as such are on overwrap and packaging equipment.

Polyolefin film, for example, polyethylene film has, in the past, been used in packaging applications for the protection of bulk or soft type materials and is needed where there are no rigidly defined shapes and where heat sealability is not required and automatic wrapping and packaging equipment is not used.

However, wrapping materials made from thermoplastic polyolefin films such as polyethylene have basic advantages over cellophane and other sheeting materials which would be of great value and interest for the overwrap use. Among these great advantages for the polyolefins, especially polyethylene, as wrapping material as compared to cellophane are great extensibility and resistance to tearing, low temperature flex properties, high resistance to moisture transmission, and great resistance to deterioration on aging. It is also lower in cost than other overwrap materials.

In spite of these apparent advantages, polyolefins have a number of disadvantages, which up to now, have not been satisfactorily solved and which have prevented its use as an overwrap material and generally useful material in automatic wrapping and packaging machinery. These disadvantages include a certain lack of clarity and surface gloss, inability to effect a satisfactory peelable heat seal except under very limited temperature conditions, a tendency to stick to heated surfaces or lack of "hot slip" properties, limpness and softness or lack of stiffness or "handle," and resistance to solvents useful for solvent sealing.

Among the above disadvantages, the property of being capable of heat sealing to form a temporary or peelable heat seal over a wide temperature range is probably the most important one insofar as usefulness as an overwrap and packaging material is concerned. The polyolefin has a tendency to melt sharply upon attempted heat sealing, thus forming a permanently fused bond which cannot be opened without considerable effort and then only by tearing the polyolefin material itself, thereby ruining the overwrap. This generally narrow melting range causes the polyolefin wrapping material, and especially polyethylene, to become soft and sticky and thus become quite difficult to handle in the various types of high speed wrapping and sealing machinery in use today. Thus, the polyolefin sheeting materials presently available lack the necessary "hot slip" properties and the stiffness and "handle" properties required for use in such wrapping and packaging equipment. As the result of these deficiencies, polyolefins and films therefrom have been substantially restricted in their use on a wide scale as a wrapping material without the use of specially designed automatic wrapping equipment.

This invention consists essentially of a polyolefin, and particularly a polyethylene or polypropylene substrate which is coated on at least one side with a very thin, heat sealable copolymer film. The polyolefin film, which is preferably, but not essentially, formed by special techniques producing film having exceptional clarity and surface gloss, is initially treated by means of a flame, corona discharge, or otherwise to provide a surface which is conducive to promoting good adhesion of the later applied polymeric coating. The appropriately treated film is then coated on at least one side with a copolymer composition comprising a copolymer of a vinyl monomer and an unsaturated organic acid, preferably together wtih one or more other materials, and including a finely divided inorganic material.

Generally, but not necessarily, the polyolefin substrate itself is in the form of a film and may be for example, from 0.25 up to 5 mils in thickness with a preferred film thickness of from about 0.5 to 1.5 mils. It is to be understood, however, that films and sheeting materials of either lesser or greater thickness can be treated in accordance with the invention. The polyolefin film employed is necessarily of the type which softens or melts at temperatures sufficiently above the required sealing temperature of the copolymer coatings such that the polyolefin base substrate will not melt or become excessively weak under the operating conditions of the automatic machinery in which the coated wrapping materials is to be employed. It is considered to be of particular advantage, in the light of the current conditions prevailing in the wrapping and packaging art to employ a base polyolefin substrate, as for instance, polyethylene film which has a melting or softening point of at least 240° F.

Although the invention is particularly concerned with polyolefin film and sheeting materials, broadly speaking, the coatings disclosed herein and the processes disclosed may be used, for instance, to improve the surface characteristics, and particularly, heat sealability of polyolefin films, filaments, fibers, monofils, sheets, coatings irregular articles, etc., and especially those formed from polymers of ethylene or propylene, or copolymers thereof.

In carrying out the coating process of the herein described invention and in preparing the coated film and film based heat sealable packages herein disclosed, it is necessary to "activate" or pretreat the surface of the polyolefin film to be coated in order to improve specific adhesion thereto. If such a treatment is not carried out, the resulting copolymer coating is not strongly adherent and can be stripped or peeled from the polyolefin substrate. This so-called activation prepares the film surface and renders it properly adhesive for the polymeric coating to adhere thereto. The activation or treatment may be done in a variety of ways known to the art. These methods for improvement of adhesive bonding of polyolefin films include chemical treatments as with chromic acid, treatment by subjecting to a blast of hot air, flame contact treatment, and high voltage electrical discharge treatment. Although any of the above methods can be used, the electrical discharge treatment of hte polyolefin and especially of polyethylene surfaces, to improve the adhesive bonding, is preferred for this process.

There appears to be no satisfactory scientific process for a relatively simple but conclusive method for defining a degree of electronic treatment. Although it is appreciated that a more or less direct, quantitative method of measurement, would by all means, be best, there is at present no known method for doing this. Thus, the degree of electronic treatment must be at such a level to obtain a satisfactory and relatively premanent anchoring of the herein described polymeric coating to the polyolefin. One test for measuring this adhesion is the "Scotch tape" or pressure-sensitive tape test as used in the plastic film printing industry.

Another more quantitative test is also available for measuring this treatment level. In this test, one-half inch wide 3M Acetate Tape No. 800 produced by Minnesota Mining & Mfg. Co., is sealed at room temperature to the treated film sample which is backed with a pressure-sensitive tape to decrease the extensibility of the film during the following test. A pressure of 800 gms./in.$^2$ for 3.5 seconds is used for sealing. The seal is then separated in peel at a speed of 5"/minute on an Instron tensile tester. The average force is determined by integration and the average of five tests is reported. The reference to this test is Wechsberg and Webber, "Electrical Discharge Surface Treatment of Polyethylene," 15th Antec of SPE, Paper 84-c (January 1959).

For example, with some base resin films, a desired treatment level results when the film is passed through an electrode system at the rate of from about 40–100 feet per minute with a current of about 0.82 to 2.2 amperes per foot of web width, the rate being adjusted in inverse relationship to the current for best results. A usable product could be made, with this electrode system at 70 feet per minute using a current for example from 0.87 amp. per foot of web width to the capacity of the system. Furthermore, various speeds of treating can be used by proper alteration of the current level, provided there is no "burn-through" of the film during treatment.

As a broad description of the alkali soluble copolymer used as the coating composition, there may be included copolymers of a vinyl ester such as vinyl acetate, vinyl propionate, vinyl butyrate and the like, the organic acid group having from 2 to 8 carbon atoms, together with an unsaturated organic acid. The unsaturation should be carbon to carbon ethylenic unsaturation. The organic acid may have up to six carbon atoms such as acrylic, crotonic, isocrotonic, methacrylic, tiglic, and angelic. Other useable unsaturated organic acids include the lower alkyl monoesters of dibasic acids such as monomethyl, monoethyl, monobultyl maleates, fumarates, itaconates or citraconates and the like and mixtures of the foregoing.

The copolymers of interest for use in this invention are characterized by having solution viscosities in the range of 5 to 30 centipoises (cps.) for molar solutions of them in ethanol. The viscosity values for the copolymers are preferably but not necessarily in this range.

Such copolymers are available commercially and are used for a number of purposes and their modes of preparation are well known. For example, processes for producing these polymer materials are shown in U.S. Patents 2,263,598; 2,317,725; 2,657,187; 2,643,245; 2,657,189; 2,816,877; 2,643,246 as well as others.

The copolymers of vinyl acetate with crotonic acid, or a monoester of maleic acid, particularly monoesters of alcohols of 1 to 8 carbon atoms are preferred for the preparation of the coatings because of ready availability, relative ease of solution in mildly alkaline aqueous solutions, relative ease of film formation and good heat sealability over a wide temperature range to form "peelable" seals.

Since it is desirable that the copolymers employed be soluble or dispersable in aqueous alkaline solution, the acid comonomer should constitute from 2 to 15% by weight of the copolymer, with the vinyl ester comonomer constituting the remaining 98 to 85%. The copolymer must be capable of application from such aqueous solution. Vinyl acetate-crotonic acid copolymers are particularly satisfactory for the purposes herein described, because of their ready solubility and excellent film formation. The copolymer must form a strong bond with the treated polyolefin surfaces.

In contrast to the above-described copolymers, polyvinyl acetate homopolymer resins applied to electrically treated polyolefin films from aqueous dispersions, frequently termed "latices," do not form strong bonds and are not capable of forming strong heat seals.

Another property of the copolymers which is particularly critical is the heat sealability and the heat sealing temperature. It is necessary that the heat sealing temperature of the copolymer coating must be at least below the softening or melting point of the substrate or polyolefin structure to which the coating is applied. It is preferred that the copolymer of the class described more fully above be capable of forming a cohesive bond at temperatures below the temperature at which the polyolefin substrate is significantly distorted. Since such polyolefins vary widely in this property even to those commercially available, it is difficult to define the limits in terms of numerical values. With variations in type of polyolefin and density, the actual softening point temperatures will be quite different.

It is possible also to add the coating from a non-aqueous solution using, for example alcohols, ketones, esters, aldehydes, hydrocarbons, etc., provided that solvent recovery equipment is available; also explosion proof equipment should be used.

However, in organic solutions it is difficult to keep colloidal inorganic material well dispersed and hence the resulting coated film tends to be inferior to those deposited from alkaline aqueous solution.

As stated above, in most instances, and to achieve the best results, the coating of the substrate by the coating composition is done from an aqueous solution containing the copolymer substance. The copolymer is dissolved in dilute ammonia or in the aqueous solution of a volatile amine such as aliphatic amines, alkylol amines, and the like. The ammonia or amine salt being soluble in cold, warm or hot water, is also further compounded and mixed with other agents as desired, and as hereinafter disclosed.

The solution preferably in aqueous form is then applied to the appropriately treated polyolefin structure or surface in any convenient and known manner, as by dipping, spraying, brushing, roll coating, gravure coating, etc., preferably at a temperature of 60–150° F. The excess aqueous solution may be removed by squeeze rolls, doctor knives, etc. The coating composition should be applied in such amount that there will be deposited upon drying, a smooth evenly distributed layer of from 0.02 to 0.5 mil thickness, a thickness of from about 0.05 to 0.10 mil being preferred. The thickness of applied coating is sufficient to impart the desired heat sealability and stiffness characteristics to the base polyolefin film structures.

The coating on the polyolefin is subsequently dried by hot air, radiant heat or by any other convenient means. Upon drying, the ammonium or amine salt of the copolymer is decomposed, evolving the volatile ammonia or amine and leaving a non-water soluble, clear, adherent, glossy coated polyolefin, such as for instance a wrapping material or film.

After the appropriate coating operations have been carried out, the polyolefin substrate film, will, after drying be coated on one or both sides with an adherent coating which coating will provide a coated polyolefin having good "hot slip" and anti-block properties, improved gloss, decreased drape (greater stiffness) and heat sealing properties such that the film can be used in commercial and readily available wrapping and sealing machines without radical modification of the machines and produce packages having a secure but "peelable seal."

Thus, the coated polyethylene base film produced by the present invention is entirely capable of being used in presently existing automatic package wrapping machinery such as the automatic wrapping machines presently employed for wrapping products in cellophane and produces tight packages with a "peelable seal."

The products contemplated as being especially suited and well adapted for packaging and for which the sheeting material of this invention is particularly suited for use include such items and products as bread, bakery products, cigarettes, tobacco, candy, crackers, boxed products, potato chips, candles, and the like.

For all items of food packaging, it is also necessary that the copolymer coatings and other components contained in said coating be non-toxic and essentially odorfree.

It is also of especial importance in the practice of this invention that a suitable component be added to impart "hot slip," that is, satisfactory slip properties when the wrapping material or partially wrapped package passes in contact with the heated portions of the wrapping apparatus and the heated platens thereof. It is usually defined quantitatively as the coefficient of friction at the temperature and pressure used.

In order to produce a coated polyethylene wrapping material having the above characteristics there is applied to the polyethylene a composition made up of a copolymer of an aliphatic ethylenically unsaturated acid and a vinyl ester, such as a copolymer of crotonic acid as the film forming and heat sealing agent together with a solid, finely divided, water insoluble, inorganic material such as colloidal silica, to function as a hot slip agent. Other finely divided inorganic materials which can be used to enhance "hot slip" properties include such water insoluble solids as diatomaceous earth, calcium silicate, bentonite, and finely divided clays. In order to function most efficiently, it is desirable that this finely divided inorganic material have a particle size between 10 and 200 millimicrons, an alkali stabilized silica dispersion being the preferred material for use.

While the amounts of each material required for producing the optimum hot slip properties varies depending on the material used, the coating compositions, and other variables of composition and process, it is preferred to use from 35 to 60% by weight (based on the copolymer) of the slip agent.

"Blocking" is the tendency of the film to adhere to itself when two or more surfaces of the film are held pressed together, for example when sheets of the film are stacked in storage. It is more pronounced at elevated temperatures and high relative humidities. Under normal storage conditions, the maximum temperatures encountered will be between 100 and 110° F. and the humidity may run as high as 90–100%. It is desirable that under these conditions the coated film will not stick to itself, or, in other words, that it be resistant to blocking. Otherwise, when the film is stored in rolled form on cores, for example, the layers will stick together and the film cannot readily be unwound for use.

Anti-blocking materials which may be used include finely divided waxes and wax-like materials which melt at temperatures above the maximum temperatures encountered in the storage of the film and are not soluble in the copolymer at these temperatures. Specific examples are natural waxes such as paraffin wax, microcrystalline wax, beeswax, carnauba wax, japan wax, montan wax, etc., and synthetic waxes such as hydrogenated castor oil, chlorinated hydrocarbon waxes, long chain fatty acid amides, etc.

Another group of materials which may be added are finely divided high polymers which soften at temperatures above the maximum storage temperatures and are not soluble in the copolymer. Specific examples include polyvinyl chloride and its copolymers, polystyrene, polymethyl methacrylate, etc.

It has also been found for instance that frequently the hot slip agent will also function as an anti-blocking agent. One such material is alkali stabilized silica, as will be shown in more detail in the exampes below.

The commercial wrapping and packaging machines envisioned for use with this novel flexible wrapping material and for which the herein described coated polyethylene film is especially adapted, may comprise a variety of such machines in use in commercial practice. The designs of these machines may vary in mechanical detail but, their functions may be described as follows:

In general, the product to be packaged is fed, for instance, by automatic conveyor as by a belt into one section of the apparatus, and simultaneously the film roll packaging stock is fed and cut to proper size or previously cut film sections are automatically folded around said product to encase it therein. The folds and/or overlaps are held in place by mechanical means and the encased or wrapped product is then conveyed over, passed adjacent to, or under heated platens to effect heat seal of the folds and/or overlaps.

In orer to operate efficiently in such equipment, it is necessary that the flexible sheeting or wrapping material be capable of forming a heat seal at temperatures capable of attainment by the platens. In commercial use, the temperature of the platens can be varied over relatively wide limits.

For use in such equipment, it is contemplated that the herein described coated polyolefin material be capable of forming a heat seal at temperatures below that at which the base polyolefin tends to shrink or distort because of softening or disorientation. In addition, the seal is preferably of the "peelable" type, that is, in practical terms, the package, or product as finally encased in the sheeting material is relatively easily accessible merely by peeling the sealed layers of coated film apart without tearing the film substrate.

It is also desirable but not absolutely essential in all types of packaging equipment that the film posses a sufficient degree of stiffness such that it can be handled mechanically in such equipment.

The coatings described herein have been found to impart favorable stiffness characteristics when applied to the polyolefin film.

In addition to the above, the sheeting material used should have good "hot slip" properties as above described in greater detail. "Hot slip" is the ability of the wrapping material to slide over the heated platens of the apparatus for packaging and wrapping as herein described. The platens may or may not be covered with an anti-fritcion or other modified types of platen or sealing surface covers.

In using automatic wrapping machinery, it will be appreciated that, because the wrapped packages are moving at a good rate of speed, the sealing platens must be at a somewhat higher temperature than the sealing point of the wrapping material. It has been found that in presently existing commercial wrapping equipment the sealing platens must be heated to a temperature of about 240° F. to achieve practical speeds. The heat transfer characteristics of the coated polymer are such that with about a three second dwell time or possibly slightly less the heat sealing temperature of 180° F. of the coating is reached and a satisfactory seal is obtained. There are instances when the package to be wrapped stops with the sealing platens in contact with the wrapping material. Should this happen it is important that the wrapping material not soften excessively and preferably that it not stick or leave a deposit on the sealing platen. It is also recognized that the wrapping material must slip readily past the hot sealing platen and, as pointed out above, this characteristic has been termed the "hot slip" property of the material. For instance, and typically, polyethylene films to which the present invention is particularly applicable, although not limited thereto are those fashioned from intermediate to high density polymers, i.e., polymers haivng a density of about 0.935, and has been effectively applied to higher density polyethylene, i.e. having a density of from about 0.930 to about 0.960. These polymers will also have a tensile strength in the unannealed state in the range of about 1,100 to 3,500 p.s.i., and a stiffness modulus of annealed state of 50,000 to 140,000 p.s.i. The polyethylene films are highly resistant to strong acids and bases, to heat up to about 200° F. and to cold down to about −70° F. and have sharp heat sealing or fusing temperatures ranging from about 230° to about 260° F. Several commercial processes are available for producing such intermediate and high density polyethylene polymers, two of which are the high pressure free radical (peroxide) catalyst process, and the low pressure ionic catalyst process. For instance, the available commercial polyethylenes having a fusion temperature above about 240° F. which can be subjected to temperatures of about 180° to 230° F. to allow sealing of the coating without danger of damaging the film are useful in accordance herewith, the copolymer coating compositions being so chosen that their heat seal temperatures are below these temperatures. This film is then treated with a composition including a heat sealing copolymer agent and at least a hot slip inorganic agent to provide an adherent coating which is water insoluble, heat sealable in the range of 180° to 230° F., substantially nonblocking at temperatures of at least 100° F. and below, and which provides a clear flexible, high gloss polyethylene film wrapping material having the desired characteristics of stiffness and hot slip.

In one test, for example, a bread wrapping machine, initially intended and designed for use with wax paper and cellophane base wrapping materials, was employed with polyethylene film coated as described above.

The coated film had adequate stiffness so that it could be pushed through the machine by the usual mechanism, exhibited hot slip characteristics such that the wrapped package readily slid past the heating units received a strong tight heat seal and even when the package was stopped with the film in contact with the hot sealing platens the wrapping material neither fused nor stuck to the platens and could be readily slid past them upon resumption of movement of the mechanism.

Another type of polyolefin film which can be advantageously coated with the formulations described in this invention is molecularly oriented isotactic polypropylene. This type of film is produced from polypropylene which has been polymerized by means of the so-called "Ziegler" catalysts to give resins having highly ordered molecular structures. After extrusion by conventional means, the hot sheet is molecularly oriented by stretching several fold in both the machine and transverse directions at controlled temperatures. The effect of orientation is greatly to increase the tensile and stiffness properties of the film. However, the uncoated film cannot readily be heat sealed by conventional techniques because of the high degree of shrinkage exhibited by the film at its sealing temperature, which in turn is caused by a relaxation of the oriented molecules into more random arrangements. If the oriented film is treated by exposure to high intensity electrical discharge and coated in the same manner as the polyethylene films described above, the resultant product can then be heat sealed satisfactorily at temperatures sufficiently low to prevent shrinkage of the base film. Packages produced with this film are exceedingly strong, glossy and appealing to the eye and can readily be opened by peeling the sealed layers of film apart.

It is contemplated in the broad aspects of the invention herein disclosed that the coating compositions for polyolefin structures and the process of applying such coating compositions to polyolefin surfaces, including, without limitation, film, sheeting material and the like are novel. It is also contemplated that the coated polyethylene structures themselves are novel, as well as the heat sealed containers, structures and packages formed therefrom either with or without the encasement of the product therein.

While there are disclosed below but a limited number of embodiments of the invention herein presented, it is possible to produce still other embodiments without departing from the inventive concept herein disclosed, and it is desired therefore that only such limitations be imposed on the appended claims as are stated therein.

EXAMPLE I

Polyethylene having a density of about 0.935 gm./ml. and crystalline melting point of 250° F. was extruded into a film of about 1.0 mil gauge using the chill roll casting technique to obtain optimum clarity. The uncoated film properties are shown below. This film was treated by exposure to an electric corona discharge with an electrode current of 1.01 amperes per foot of film width and a film rate of 70 feet per minute.

The treated film was then coated on one side using a gravure roll technique with an aqueous coating composition comprising 12.35% of a copolymer composed of 95% vinyl acetate and 5% crotonic acid, the copolymer having a solution viscosity in ethanol of 10 cps., 0.21% of 28% ammonia water, 17.50% of a 30% solids alkali stabilized aqueous dispersion of colloidal silica with particles ranging from 17 to 170 millimicrons, 0.37% of a 33% solids aqueous dispersion of a hydrogenated castor oil wax having an average particle size of 5–10 microns, and the remainder of the coating composition being water. The film was then dried by radiant heat and the coating process repeated on the other side of the film using the same coating composition. The dried, coated film was then wound into rolls and slit into suitable widths for use as a wrapping film.

The properties of the base film used to produce the coated film were as follows:

| | |
|---|---|
| Gauge | 0.89 mil. |
| Yield strength, MD [1] | 1980±4% p.s.i. |
| Yield strength, TD [2] | 1980±4% p.s.i. |
| Ultimate tensile, MD | 2590±18% p.s.i. |
| Ultimate tensile, TD | 2070±15% p.s.i. |
| Elongation, MD | 430±10%. |
| Elongation, TD | 500±34%. |
| Apparent modulus of elasticity in tension: | |
| MD | 45,300±4%. |
| TD | 57,800±7%. |
| "Handle" [3] | 4.7 gm./inch. |
| Gardner haze | 3.4±9%. |
| 45° Gardner gloss | 83.2±1%. |

[1] Machine direction.
[2] Transverse direction.
[3] "Handle" is a measure of the stiffness of a thin film, as measured by the Thwing-Albert Handle-O-Meter. This value is important as an indication of the ability of a film to be used in automatic packaging equipment designed for use with cellophane, which has a handle of about 19 gm./inch.

The properties of the coated film were as follows:

| | |
|---|---|
| Thickness of coating (each side) | 0.07 mil. |
| Yield strength, MD [1] | 2220±6% p.s.i. |
| Yield strength, TD [2] | 2400±4% p.s.i. |
| Ultimate strength, MD | 2550±6% p.s.i. |
| Ultimate strength, TD | 2030±5% p.s.i. |
| Elongation, MD | 410±10%. |
| Elongation, TD | 430±33%. |
| Apparent modulus, MD | 115,000±4% p.s.i. |
| Apparent modulus, TD | 132,000±4% p.s.i. |
| "Handle" | 15.2 gm./inch. |
| Gardner haze | 1.2±8%. |
| 45° Gardner gloss | 81.1±1%. |
| Heat seal strength [3] | 100 gm./in. |

[1] Machine direction.
[2] Transverse direction.
[3] Sealed at platen temperature of 225° F., 3.5 seconds dwell time, 30 grams/sq. in. pressure.

The blocking resistance of the coated film at 100° F., and 50% relative humidity was excellent.

A roll of this coated film was then affixed in an American Machine and Foundry, Model 3-121, bread wrapping machine and used to wrap individual loaves of bread. The temperatures of the various platens were controlled such that secure but "peelable" seals were formed from the coated film to produce wrapped packages containing the bread product. From fifty to sixty loaves per minute can be continuously wrapped in this way.

EXAMPLE II

Table 1

| Run No | 1 | 2 | 3 | 4 | 5 | 6 |
|---|---|---|---|---|---|---|
| Vinyl acetate-3% crotonic acid copolymer, 10 cps. viscosity, percent | 12.1 | | | | | |
| Vinyl acetate-5% crotonic acid copolymer, 10 cps. viscosity, percent | | 12.1 | 12.1 | 12.1 | 12.1 | 12.1 |
| Ammonia, 28% aq., percent | 0.2 | 0.2 | 0.2 | 0.2 | 0.2 | 0.2 |
| Colloidal silica, percent | 5.3 | 5.3 | | 5.3 | 5.3 | 5.3 |
| NH₄ salt of a complex polymeric organic acid | 0.05 | 0.05 | 0.05 | 0.05 | 0.05 | 0.05 |
| Hydrated calcium silicate | | 0.1 | 0.5 | | 0.1 | |
| Hydrogenated castor oil | | | | 0.05 | 0.025 | 0.25 |
| Water | 82.4 | 82.3 | 87.2 | 82.4 | 82.3 | 81.1 |
| Thickness (mils per side) of dry coating | 0.1 | 0.05 | 0.1 | 0.1 | 0.1 | 0.1 |
| Clarity | Good | Good | Fair | Good | Fair | Good |
| Heat seal strength | Good | Good | Good | Fair | Fair | Good |
| Hot slip | Fair | V. good | Good | Good | Good | Good |
| Resistance to blocking, 73° F.; 65% relative humidity | Good | Good | Good | Good | Good | Good |
| Resistance to blocking, 120° F.; 30% relative humidity | Poor | Fair | Good | Good | Good | Good |

Further examples of comparative coating formulations, together with qualitative evaluation of product properties obtained thereby are shown in Table 1 above. In all the above runs described, the clarity, heat seal (both strength and peelability characteristics), hot slip and resistance to blocking were satisfactory except in run 1, in which the resistance to blocking of the film at 120° F. was unsatisfactory because of the absence of sufficient antiblocking agent. All proportions of the various ingredients shown above are in percentages by weight of the coating solution.

EXAMPLE III

Table 2

| Run No | 7 | 8 | 9 | 10 | 11 |
|---|---|---|---|---|---|
| Vinyl acetate-3% crotonic acid copolymer, 10 cps. viscosity | 1.0 | 1.0 | 1.0 | 1.0 | 1.0 |
| Colloidal silica (100%), pts | | 0.33 | 0.37 | 0.40 | 0.44 |
| NH₄ salt of a complex polymeric organic acid (20% aqueous solution), pts | 0.022 | 0.022 | 0.022 | 0.022 | 0.022 |
| Ammonia (28% aq.), pts | 0.06 | 0.06 | 0.06 | 0.06 | 0.06 |
| Clarity | V. good | Good | Good | Good | Good |
| Heat seal | V. good | Good | Good | Good | Good |
| Hot slip | V. poor | V. poor | Good | V. good | Exc. |
| Blocking resistance 73° F | Fair | Fair | Good | Good | Good |

In Table 2 above, the amount of the various ingredients are given in parts per part of copolymer resin. The various runs show the effect of the concentration level of the colloidal silica, the "hot slip" agent used in these compositions. Runs 9, 10, and 11 are quite satisfactory in all properties, while runs 7 and 8 are unsatisfactory in both hot slip properties and blocking resistance because of the absence or relatively low level of colloidal silica in the coating composition.

EXAMPLE IV

Table 3

| Run No | 12 | 13 | 14 |
|---|---|---|---|
| Vinyl acetate-3% crotonic acid copolymer, 10 cps. viscosity | 1.0 | | |
| Vinyl acetate-3% crotonic acid copolymer, 20 cps. viscosity | | 1.0 | |
| Vinyl acetate-5% crotonic acid copolymer, 10 cps. viscosity | | | 1.0 |
| Colloidal silica, pts | 0.44 | 0.44 | 0.44 |
| NH₄ salt of a complex polymeric organic acid (20% aqueous solution), pts | .022 | .022 | .022 |
| Ammonia (28% aq.), pts | .066 | .066 | .083 |
| Clarity | V. good | V. good | V. good |
| Heat Seal | V. good | V. good | V. good |
| Hot Slip | Excel. | Excel. | Excel. |
| Block resistance: | | | |
| 73° F | Good | Good | Good |
| 100° F | Poor | Poor | Fair |

In Table 3 above, the amount of the various ingredients are given in part per part of copolymer resin used. This table is presented to show that various types of vinyl acetate-unsaturated acid copolymers varying in both monomer composition and in viscosity values can be used for the coating composition, and as such are satisfactory except for blocking resistance which can be satisfactorily improved by the use of air anti-blocking agents such as finely dispersed hydrogenated castor oil or other suitable wax, as disclosed herein above.

EXAMPLE V

Table 4

| Run No | 15 | 16 | 17 | 18 | 19 |
|---|---|---|---|---|---|
| Vinyl acetate-5% crotonic acid copolymer, 10 cps. viscosity | 1.0 | 1.0 | 1.0 | 1.0 | 1.0 |
| NH₄ salt of a complex polymeric organic acid (20% aqueous solution), pts | .022 | .022 | .022 | .022 | .022 |
| Ammonia (28% aq.), pts | .083 | .083 | .083 | .083 | .083 |
| Hydrated calcium silicate, pts | 0 | .025 | .037 | .062 | .123 |
| Clarity | V. good | Good | Fair | Fair | Poor |
| Heat seal | V. good | Good | Good | Good | Fair |
| Hot slip | V. poor | Fair | Good | V. good | V. good |
| Block resistance: | | | | | |
| 73° F | Fair | Good | Good | V. good | V. good |
| 100° F | Poor | Fair | Good | Good | Good |

It has been noted that certain materials, when included in the coating composition and applied to the polyolefin film, function both as a hot slip and an anti-block agent. One material capable of doing this is hydrated calcium silicate, and its effects in varying concentrations, are shown in Table 4 above. Runs 16, 17, and 18 were quite satisfactory in all properties, while run 15, with no calcium silicate, showed very poor hot slip properties and fair to poor block resistance. Run 19 was poor in clarity and only fair in heat seal properties because of the high concentration of hydrated calcium silicate used therein.

EXAMPLE VI

Table 5

| Run No | 20 | 21 | 22 | 23 | 24 | 25 | 26 | 27 | 28 | 29 | 30 |
|---|---|---|---|---|---|---|---|---|---|---|---|
| Vinyl acetate-5% crotonic acid copolymer 10 cps. viscosity | 1.0 | 1.0 | 1.0 | 1.0 | 1.0 | 1.0 | 1.0 | 1.0 | 1.0 | 1.0 | 1.0 |
| Colloidal silica (30%), pts | 1.45 | 1.45 | 1.45 | 1.45 | 1.45 | 1.45 | 1.45 | 1.45 | 1.45 | 1.45 | 1.45 |
| NH₄ salt of a complex polymeric organic acid (20%), pts | 0.022 | 0.022 | 0.022 | 0.022 | 0.022 | 0.022 | 0.022 | 0.022 | 0.022 | 0.022 | 0.022 |
| Ammonia (28% aq.), pts | 0.083 | 0.083 | 0.083 | 0.083 | 0.083 | 0.083 | 0.083 | 0.083 | 0.083 | 0.083 | 0.083 |
| Hydrogenated castor oil, pts | | 0.0042 | 0.0084 | 0.0126 | | | | | | | |
| Calcium aluminum silicate | | | | | .010 | .015 | .030 | | | | |
| Hydrated calcium silicate | | | | | | | | 0.007 | .014 | .021 | .028 |
| Clarity | V. good | Good | Fair | Poor | Fair | Fair | Fair | Good | Good | Good | Fair |
| Heat seal | V. good | Good | Good | Fair | V. good | Fair | Fair | Good | Good | Good | Fair |
| Hot slip | Fair | Good | Good | V. good | Good | Good | Poor | Good | Fair | Good | Fair |
| Block resistance: | | | | | | | | | | | |
| 73° F | Good | Good | Good | Good | Good | Good | Good | V. good | V. good | V. good | V. good |
| 100° F | Good | Good | Good | V. good | Fair | Fair | Fair | Good | Good | Good | Good |

The above Table 5, shows variations in coating compositions, the changes made in the compositions being in the anti-blocking agent used. Except for runs 23 and 30, the compositions tested appear to function satisfactorily with respect to clarity, heat sealability, hot slip and block resistance. In run 23, the amount of hydrogenated castor-wax used for hot slip improvements was present in such high concentration that the clarity was unsatisfactory and the heat seal properties were considerably poorer. Similarly, in run 30, the amount of calcium silicate used was of such a high concentration that both clarity and heat seal properties were adversely affected.

EXAMPLE VII

It has been noted that while the application of the coating does not significantly affect the basic strength properties of the polyethylene, it does greatly increase the apparent modulus of elasticity in tension, handle, and haze value.

The most improved effect of coating thickness on the important property of "handle" can be shown by the following data.

| Coating thickness (mils each side): | "Handle"[1] (gms./inch) |
|---|---|
| 0 (uncoated film) (standard) | 5 |
| 0.02 | 8 |
| 0.048 | 9 |
| 0.068 | 12 |
| 0.078 | 12 |
| 0.094 | 19 |
| 0.096 | 22 |

[1] See definition above in Example I.

EXAMPLE VIII

Isotactic polypropylene was extruded, electronically treated, and coated substantially in the same manner as was the polyethylene described in Example I. The uncoated film had the following physical properties:

| | |
|---|---|
| Gauge | 1.01 mils. |
| Yield strength, MD | 2750±1% p.s.i. |
| Yield strength, TD | 3370±24% p.s.i. |
| Ultimate strength, MD | 3400±50% p.s.i. |
| Ultimate strength, TD | 3370±24% p.s.i. |
| Elongation, MD | 535±24%. |
| Elongation, TD | 7±50%. |
| Apparent modulus of elasticity in tension: | |
| MD | 69,100±26% p.s.i. |
| TD | 89,100±29 p.s.i. |
| "Handle" | 8.6±2 gm./in. |

The coated film had the following properties:

| | |
|---|---|
| Gauge of coating (each side) | 0.11 mil. |
| Yield strength, MD | 3670±4% p.s.i. |
| Yield strength, TD | 2260±25% p.s.i. |
| Ultimate strength, MD | 5060±1% p.s.i. |
| Ultimate strength, TD | 2270±28% p.s.i. |
| Elongation, MD | 550±27% p.s.i. |
| Elongation, TD | 373±24% p.s.i. |
| Apparent modulus, MD | 192,000±11%. |
| Apparent modulus, TD | 171,000±24%. |
| Handle | 26.6 gm./in. |
| Heat seal strength[1] | 90 gms./inch. |

[1] Sealed at platen temperature of 285° F. 3.5 seconds dwell time, 30 grams/sq. in. pressure.

Blocking resistance of the coated film at 100° F. and 50% relative humidity was excellent.

EXAMPLE IX

Polypropylene film which had been molecularly oriented in two directions was electronically treated and coated in substantially the manner as that described in Example I above.

| | |
|---|---|
| Gauge | 0.57 mil. |
| Yield strength, MD | 5900±4% p.s.i. |
| Yield strength, TD | 29,000±19% p.s.i. |
| Ultimate strength, MD | 10,000±30% p.s.i. |
| Ultimate strength, TD | 28,700±19% p.s.i. |
| Elongation, MD | 100±50% p.s.i. |
| Elongation, TD | 10±20% p.s.i. |
| Apparent modulus of elasticity in tension: | |
| MD | 190,000±40% p.s.i. |
| TD | 520,000±6% p.s.i. |
| "Handle" | 5.0 gm./inch. |

The coated film had the following properties:

| | |
|---|---|
| Gauge of coating | 0.06 mil. |
| Heat seal strength [1] | 35 gm./in. |
| Yield strength, MD | 5190±3% p.s.i. |
| Yield strength, TD | 32,900±17% p.s.i. |
| Ultimate strength, MD | 9100±15% p.s.i. |
| Ultimate strength, TD | 32,900±17% p.s.i. |
| Elongation, MD | 104±37% p.s.i. |
| Elongation, TD | 16±40% p.s.i. |
| Apparent modulus of elasticity in tension: | |
| MD | 274,000±6% p.s.i. |
| TD | 574,000±4% p.s.i. |
| "Handle" | 9.4 gm./in. |

[1] Sealed at platen temperature of 285° F.

Blocking resistance of the coated film at 100° F., and 50% relative humidity was excellent.

What is claimed is:

1. A wrapping material comprising polyolefin film having a density in the range of 0.925 and 0.945 gm./ml. and a thickness of about 0.8 to 2 mil, and a coating on at least one surface of said polyolefin film, said coating of 0.02 to 0.20 mil thickness consisting essentially of, a copolymer of vinyl acetate and an ethylenically unsaturated acid having up to 6 carbon atoms wherein said vinyl acetate is in the amount of about 85 to about 98% by weight and said acid is in the amount of about 2 to about 15% by weight, said copolymer being capable of forming a cohesive bond at temperatures below the temperatures at which said polyolefin becomes substantially distorted, and finely divided silica, said wrapping material having increased stiffness, and improved heat sealability.

2. A wrapping material as defined in claim 1 in which the coating also contains a wax as an anti-block agent.

3. The wrapping material of claim 1 wherein the polyolefin is polyethylene.

4. The wrapping material of claim 1 wherein the polyolefin is polypropylene.

5. The wrapping material of claim 1 wherein the polyolefin is molecularly oriented polyethylene.

6. The wrapping material of claim 1 wherein the polyolefin is molecularly oriented polypropylene.

7. A wrapping material comprising substantially isotactic polypropylene film which has been molecularly oriented and having a thickness of about 0.3 to 1.5 mil, and a coating on at least one surface of said polypropylene film, said coating of 0.02 to 0.20 mil thickness consisting essentially of, a copolymer of vinyl acetate and an ethylenically unsaturated acid having up to 6 carbon atoms wherein said vinyl acetate is in the amount of about 85 to about 98% by weight and said acid is in the amount of about 2 to about 15% by weight, said copolymer being capable of forming a cohesive bond at temperatures below the temperatures at which said polypropylene becomes substantially distorted, and finely divided silica, said wrapping material having increased stiffness, and improved heat sealability.

8. A process for improving the heat sealability of polyolefin films and imparting thereto such characteristics of stiffness and hot slip as to permit their use in commercial wrapping and packaging machines which consists essentially of (1) treating the surface of said polyolefin to render it adhesive, (2) applying to said treated surface a coating of 0.02 to 0.5 mil thickness consisting essentially of a copolymer of vinyl acetate and an ethylenically unsaturated acid having up to 6 carbon atoms wherein said vinyl acetate is in the amount of about 85 to about 98% by weight and said acid is in the amount of about 2 to about 15% by weight, said copolymer being capable of forming a cohesive bond at temperatures below the temperatures at which said polyolefin becomes substantially distorted, and a finely divided inorganic siliceous material, and (3) thereafter drying said thus coated polyolefin.

9. The process of claim 8 wherein the polyolefin is polyethylene.

10. The process of claim 8 wherein the polyolefin is polypropylene.

11. The process of claim 8 wherein the polyolefin is molecularly oriented polyethylene.

12. The process of claim 8 wherein the polyolefin is molecularly oriented polypropylene.

13. The process of claim 8 wherein the inorganic siliceous material is silica.

14. The process of claim 8 wherein the polyolefin is polyethylene which has a minimum density of 0.925 gm./ml.

15. The process of claim 8 wherein the polyolefin film is 0.25 up to 5 mils in thickness.

16. The process of claim 8 wherein the coating also contains a wax as an anti-block agent.

References Cited in the file of this patent

UNITED STATES PATENTS

| | | |
|---|---|---|
| 2,631,954 | Bright | Mar. 17, 1953 |
| 2,639,808 | Barry et al. | May 26, 1953 |
| 2,653,113 | Banigan | Sept. 22, 1953 |
| 2,676,121 | Chapman | Apr. 20, 1954 |
| 2,697,434 | Rodman | Dec. 21, 1954 |
| 2,795,820 | Grow et al. | June 18, 1957 |
| 2,810,933 | Pierce et al. | Oct. 29, 1957 |
| 2,816,877 | Price | Dec. 17, 1957 |
| 2,838,437 | Busse et al. | June 10, 1958 |
| 2,909,443 | Wolinski | Oct. 20, 1959 |
| 2,927,047 | Schulde et al. | Mar. 1, 1960 |